United States Patent
Neelakandan et al.

(10) Patent No.: US 10,791,514 B2
(45) Date of Patent: Sep. 29, 2020

(54) NEIGHBOR AWARENESS NETWORKING TETHERING

(71) Applicant: Avago Technologies International Sales Pte. Limited, Singapore (SG)

(72) Inventors: Sriram Neelakandan, Bangalore (IN); Raghavendra Malladi, Hyderabad (IN); Samson Kativarapu, Hyderabad (IN); Jagadeesh Cherukuri, Hyderabad (IN); Swaraj Vutturi, Hyderabad (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 122 days.

(21) Appl. No.: 15/683,271

(22) Filed: Aug. 22, 2017

(65) Prior Publication Data
US 2019/0069234 A1 Feb. 28, 2019

(51) Int. Cl.
| | |
|---|---|
| H04W 52/02 | (2009.01) |
| H04W 8/00 | (2009.01) |
| H04W 48/16 | (2009.01) |
| H04W 72/12 | (2009.01) |
| H04W 28/08 | (2009.01) |
| H04W 48/20 | (2009.01) |
| H04W 88/04 | (2009.01) |
| H04W 84/18 | (2009.01) |
| H04W 74/08 | (2009.01) |
| H04W 76/23 | (2018.01) |
| H04W 88/08 | (2009.01) |

(52) U.S. Cl.
CPC ....... *H04W 52/0216* (2013.01); *H04W 8/005* (2013.01); *H04W 28/08* (2013.01); *H04W 48/16* (2013.01); *H04W 48/20* (2013.01); *H04W 72/1205* (2013.01); *H04W 88/04* (2013.01); *H04W 74/0808* (2013.01); *H04W 76/23* (2018.02); *H04W 84/18* (2013.01); *H04W 88/08* (2013.01)

(58) Field of Classification Search
CPC . H04W 52/0216; H04W 8/005; H04W 48/16; H04W 72/1205; H04W 76/23; H04W 74/0808; H04W 84/18
USPC .......................................................... 370/311
See application file for complete search history.

(56) References Cited

U.S. PATENT DOCUMENTS

| | | | | |
|---|---|---|---|---|
| 9,788,275 | B2 * | 10/2017 | Eo ..................... | H04W 52/0251 |
| 2007/0299945 | A1 * | 12/2007 | Lunsford .............. | G06F 19/321 |
| | | | | 709/223 |

(Continued)

*Primary Examiner* — Christopher R Crompton
(74) *Attorney, Agent, or Firm* — Foley & Lardner LLP

(57) ABSTRACT

In some aspects, the disclosure is directed to methods and systems for NAN tethering a second wireless to a first wireless device. The first wireless device includes a primary processor and a secondary processor. The primary processor negotiates one or more first wake up slots for a NAN service with the second wireless device, establishes the NAN service with the second wireless device, and offloads the NAN service to the secondary processor, responsive to establishing the NAN service and prior to the primary processor entering into a sleep mode. The secondary processor renegotiates one or more second wake up slots with the second wireless device for the offloaded NAN service. The secondary processor is configured to wirelessly tether, the second wireless device to the first wireless device, using the one or more second wake up slots of the offloaded NAN service.

20 Claims, 9 Drawing Sheets

(56) References Cited

U.S. PATENT DOCUMENTS

| | | | |
|---|---|---|---|
| 2013/0295848 A1* | 11/2013 | O'Neill | H04W 68/00 |
| | | | 455/41.2 |
| 2014/0181172 A1* | 6/2014 | Elliott | H04W 28/08 |
| | | | 709/201 |
| 2016/0219422 A1* | 7/2016 | Segev | H04W 8/005 |
| 2016/0286398 A1* | 9/2016 | Abraham | H04L 63/065 |
| 2017/0064760 A1* | 3/2017 | Kandagadla | H04W 48/16 |
| 2017/0214774 A1* | 7/2017 | Chen | H04L 63/0272 |
| 2017/0325092 A1* | 11/2017 | Kneckt | H04W 76/14 |
| 2018/0206193 A1* | 7/2018 | Adachi | H04W 52/0251 |
| 2019/0155405 A1* | 5/2019 | Lyons | G06F 1/1694 |

* cited by examiner

NEIGHBOR AWARENESS NETWORKING TETHERING

FIELD OF THE DISCLOSURE

This disclosure generally relates to systems and methods for tethering a wireless device to a network, including but not limited to systems and methods for tethering a wireless device to a network using neighbor awareness networking (NAN).

BACKGROUND OF THE DISCLOSURE

Some wireless devices performs the functionality of a tethering device, which enables data connectivity of one or more peer devices to a network, e.g., to the Internet. For example, the tethering device is connected to a cellular network and enables one or more mobile devices to connect to the Internet via the cellular network.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following standard(s) and specification(s), including any draft versions of such standard(s) and specification(s), are hereby incorporated herein by reference in their entirety and are made part of the present disclosure for all purposes: Long-Term Evolution (LTE); NAN; 3GPP; and IEEE 802.11. Although this disclosure can reference aspects of these standard(s) and specification(s), the disclosure is in no way limited to these aspects.

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for NAN tethering.

A. Computing and Network Environment

Figure 1A:
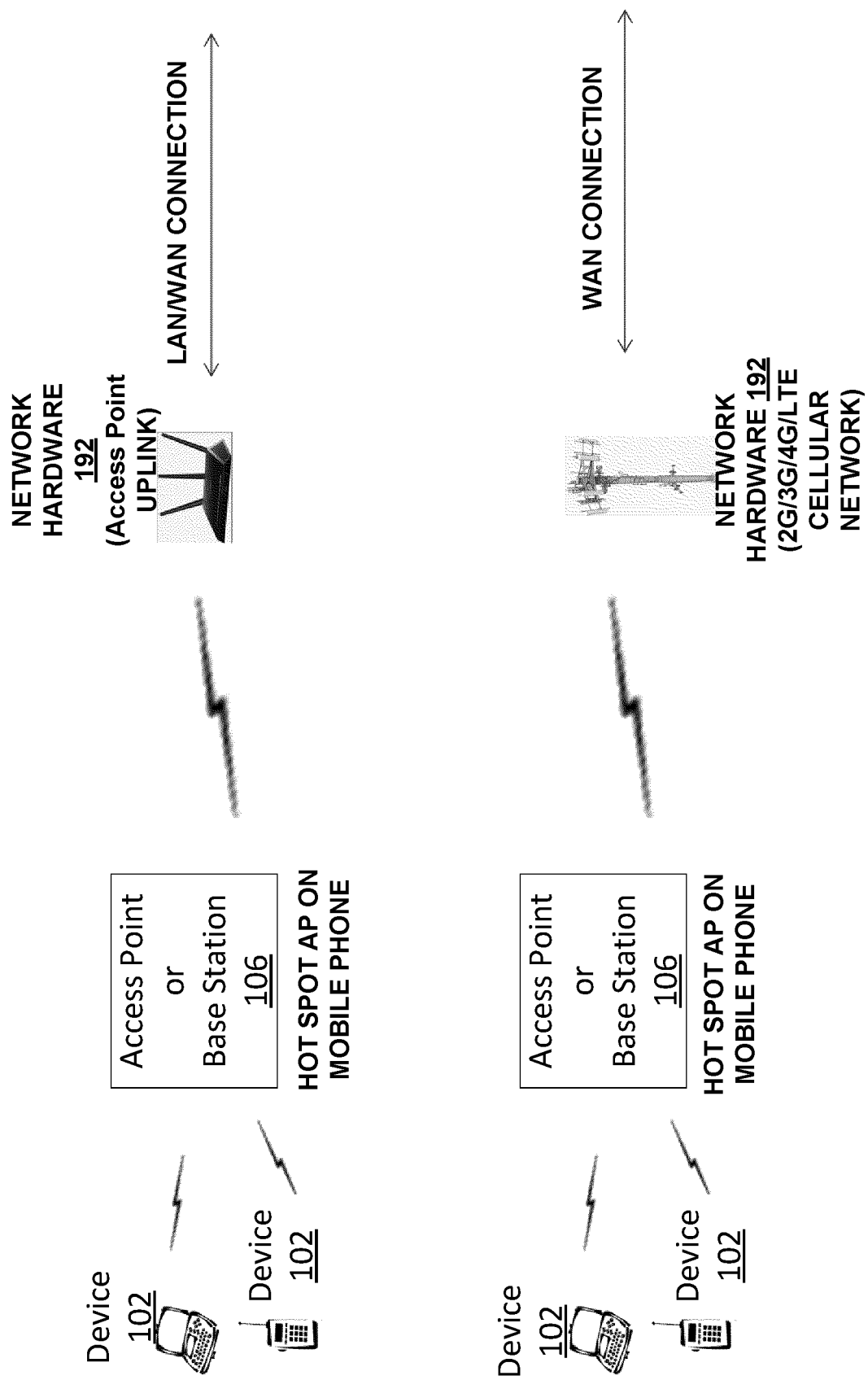
FIG. 1A is a block diagram depicting an embodiment of a network environment including one or more wireless communication devices in communication with one or more devices or stations.

Prior to discussing specific embodiments of the present solution, aspects of the operating environment as well as associated system components (e.g., hardware elements) are described in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or base station are described in greater detail with reference to FIGS. 1B and 1C. The network environment can be an ad hoc network environment, an infrastructure wireless network environment, a subnet environment, etc., in one embodiment.

Terms such as "wireless communication device", "user equipment," "mobile station," "mobile," "mobile device," "subscriber station," "subscriber equipment," "access terminal," "terminal," "user device," "user terminal," "handset," and similar terminology, can refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "access point (AP)," "wireless access point (WAP)," "base station," "base transceiver station", "Node B." "evolved Node B (eNode B or eNB)," home Node B (HNB)," "home access point (HAP)," and similar terminology, can be utilized interchangeably in the present disclosure, and refer to a wireless network component or apparatus that serves and receives data, control, voice, video, sound, gaming, or substantially any data-stream or signaling-stream from a set of wireless devices.

Referring again to FIG. 1A, the base stations 106 can be operably coupled to the network hardware 192 via local area network connections or wireless connections (such as but not limited to WiFi wireless or cellular wireless). The network hardware 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments, a base station 106 includes a device or module (including a combination of hardware and software) that allows wireless communication devices 102 to connect to a wired network using LTE, Wi-Fi, and/or other standards. A base station 106 can be implemented, designed and/or built for operating in a wireless local area network (WLAN), or in a cellular network. A base station 106 can connect to a router (e.g., via a wired network) as a standalone device in some embodiments. In other embodiments, a base station can be a component of a router. A base station 106 can provide multiple devices 102 access to a network. A base station 106 can, for example, connect to a wired Ethernet connection and provide wireless connections using radio frequency links for other devices 102 to utilize that wired connection. A base station 106 can be built and/or implemented to support a standard for sending and receiving data using one or more radio frequencies. Those standards and the frequencies they use can be defined by the IEEE or 3GPP for example. A base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
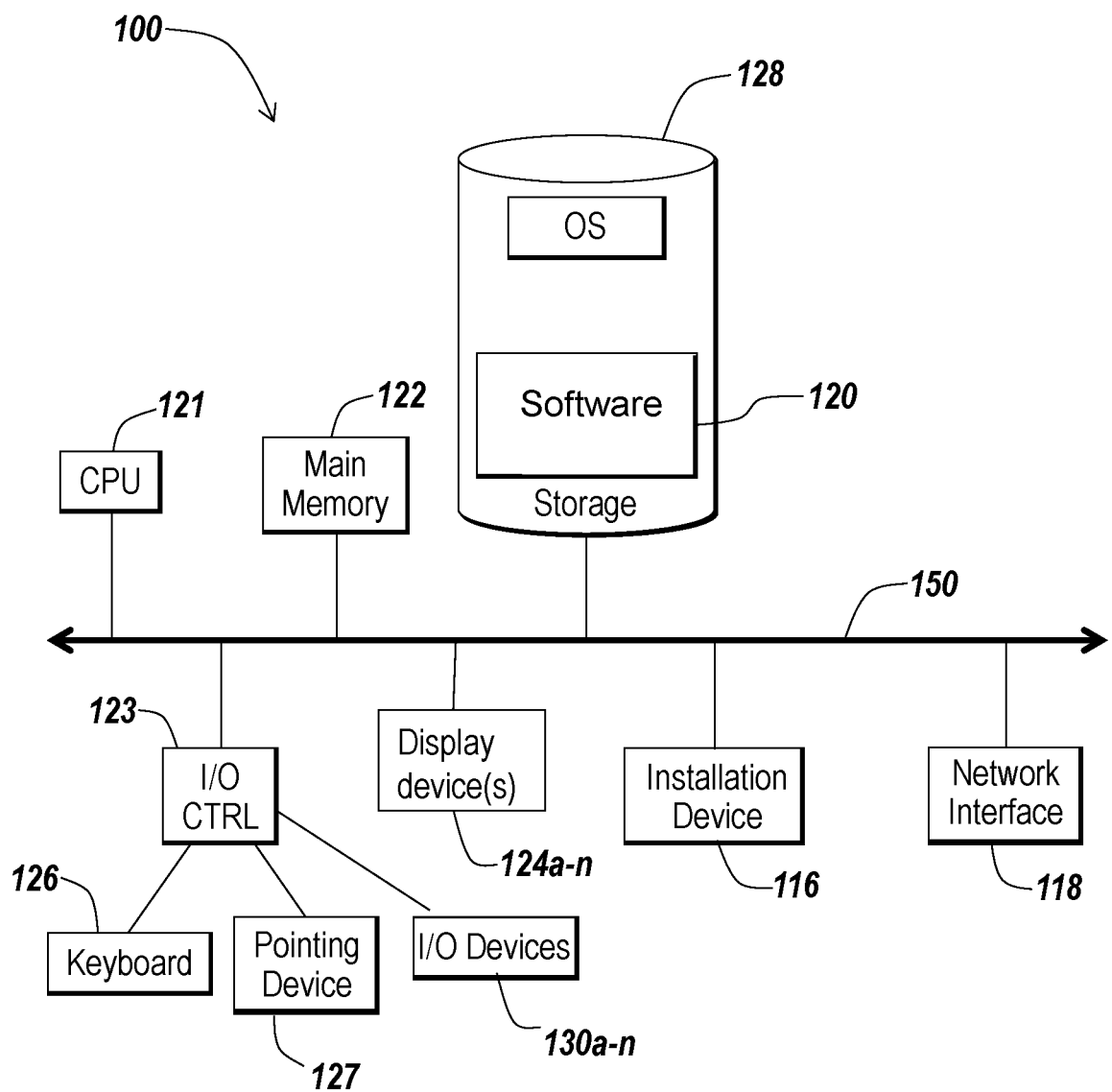
FIGS. 1B and 1C are block diagrams depicting embodiments of computing devices useful in connection with the methods and systems described herein.
Figure 1C:
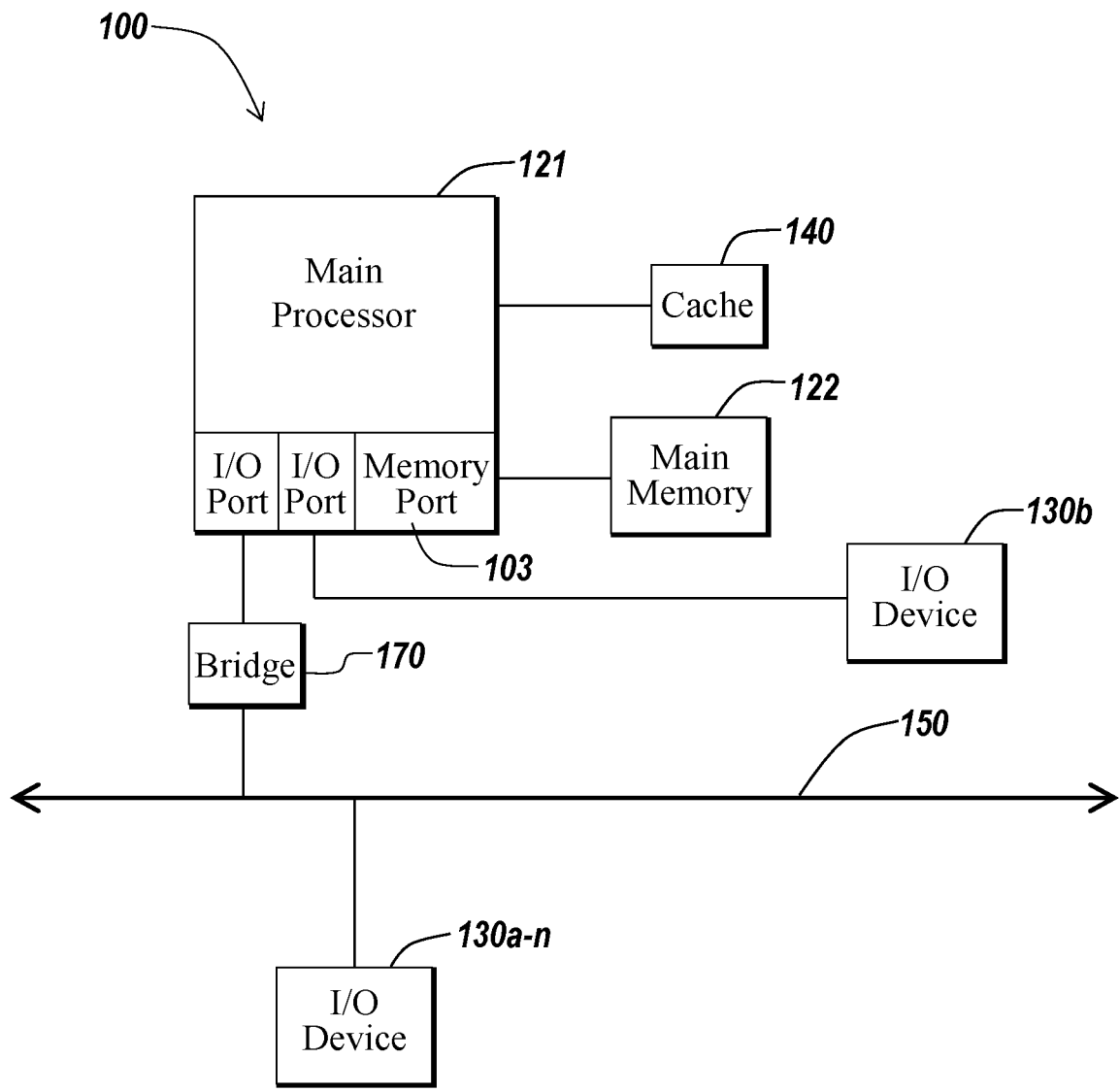

The communications device(s) 102 and base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130a-n via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 131 directly.

A wide variety of I/O devices 130a-n and 131 can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices 130a-n can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.1 lad, CDMA, GSM, WiMax, LTE, LTE-A and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be implemented for using multiple displays 124a-124n. One ordinarily skilled in the art will recognize and appreciate the various ways and embodiments that a computing device 100 can be implemented to have one or more display devices 124a-124n.

In further embodiments, an I/O device 130a-n can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, sensor, desktop computer, laptop or notebook computer, server, handheld computer, mobile telephone, or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. NAN Tethering

WiFi tethering capability on mobile devices is a popular feature to enable other peer devices to access a cellular network (e.g., 3G network, 4G network), or access an upstream access point (AP). To support WiFi tethering, a host device starts a WiFi access point (e.g., hot spot, or soft AP), which allows one or more station (STA) devices to connect to the host mobile device for data communication. However, a softAP would lead to power drain for the host device, due to the host device being constantly awake to be able to receive a packet at any time. For example, a host device including a soft AP is kept awake even when no client device is associated with the host device via tethering, or when no data is flowing to the host device, or when very few data packets are flowing to the host device. Soft AP tethering also suffers from unpredictable availability of tethering. For example, even when the host device is kept awake for receiving data, the host device is possibly unaware of whether there is a client device available for tethering.

The present disclosure describes methods and systems for tethering one or more wireless devices to a tethering device through NAN, sometimes generally referred as NAN tethering. NAN tethering is provided in the present disclosure to address the shortcomings of legacy tethering via a soft AP for instance. In one or more embodiments, NAN tethering enables a host device to wake up only in designated time slots. In one or more embodiments, the designated time slots are negotiated between the host device and one or more client devices. In one or more embodiments, NAN tethering enables a service provider (e.g., a publisher or responder) to wake up only for amounts of time negotiated with a client device (e.g., a subscriber or initiator). In one or more embodiments, NAN tethering utilizes NAN to provide service discoverability and/or a slot train to send/receive data.

In one or more embodiments, NAN tethering bridges or combines certain features of legacy tethering mechanism(s) with NAN to further reduce power consumption by offloading one or more operations from a primary processor of the host device, to a secondary processor of the host device (e.g., a dongle device). In one or more embodiments, the secondary processor can correspond to or include a WiFi dongle or semiconductor chip, which differs from the first processor (e.g., a host processor or central processing unit (CPU)). In one or more embodiments, the secondary processor is designed and/or built for establishing and/or maintaining wireless connectivity (e.g., wireless transmission/reception of data/packets, wireless tethering) with another device, using WiFi or WLAN protocol for instance.

In one or more embodiments, the disclosure is directed to a method for tethering a second wireless to a first wireless device using NAN. The first wireless device includes a primary processor and a secondary processor, in one or more embodiments. In one or more embodiments, the primary processor establishes access to communication bandwidth for communications with a network. In one or more embodiments, the primary processor receives a request for a NAN service, from the second wireless device, for wirelessly tethering to the first wireless device to access at least a portion of the communication bandwidth. In one or more embodiments, the primary processor negotiates one or more first wake up slots for the NAN service with the second wireless device responsive to the request. In one or more embodiments, the primary processor establishes the NAN service with the second wireless device according to the one or more first wake up slots. In one or more embodiments, the primary processor offloads the NAN service from the primary processor to a secondary processor of the first wireless device, responsive to establishing the NAN service and prior to the primary processor entering into a sleep mode. The secondary processor renegotiates one or more second wake up slots with the second wireless device for the offloaded NAN service, in one or more embodiments. The secondary processor wirelessly tethers the second wireless device to the first wireless device, using the one or more second wake up slots of the offloaded NAN service, in one or more embodiments.

In one or more embodiments, the disclosure is directed to a wireless device including a primary processor and a secondary processor. The primary processor establishes access to communication bandwidth for communications with a network, in one or more embodiments. The primary processor receives a request for a NAN service, from a client device, for wirelessly tethering to the wireless device to access at least a portion of the communication bandwidth, in one or more embodiments. The primary processor negotiates the one or more first wake up slots for the NAN service with the client wireless device responsive to the request. The primary processor establishes the NAN service with the client wireless device according to the one or more first wake up slots. The primary processor offloads the NAN service from the primary processor to a secondary processor of the wireless device, responsive to establishing the NAN service and prior to the primary processor entering into a sleep mode. The secondary processor renegotiates the one or more second wake up slots with the client device for the offloaded NAN service. The secondary processor provides wirelessly tethering, of the client device to the wireless device, using the one or more second wake up slots of the offloaded NAN service.

In one or more embodiments, the disclosure is directed to non-transitory computer readable memory medium of a wireless device. The memory medium stores program instructions executable by one or more processors of the wireless device to cause a primary processor to establish access by the wireless device to communication bandwidth for communications with a network, in one or more embodiments. In one or more embodiments, the wireless device receives a request for a neighbor awareness networking (NAN) service from a client device, for wirelessly tethering to the wireless device to access at least a portion of the communication bandwidth. In one or more embodiments, the wireless device negotiates one or more first wake up slots for the NAN service with the client device responsive to the request. In one or more embodiments, the wireless device establishes the NAN service with the client device according to the one or more first wake up slots. In one or more embodiments, the wireless device offloads the NAN service from the primary processor to a secondary processor of the wireless device, responsive to establishing the NAN service and prior to the primary processor entering into a sleep mode. In one or more embodiments, the memory medium stores program instructions executable by one or more processors of the wireless device to cause a secondary processor to renegotiate, for the offloaded NAN service, one or more second wake up slots with the client device, and/or to wirelessly tether the client device to the wireless device using the one or more second wake up slots of the offloaded NAN service.

Figure 2A:
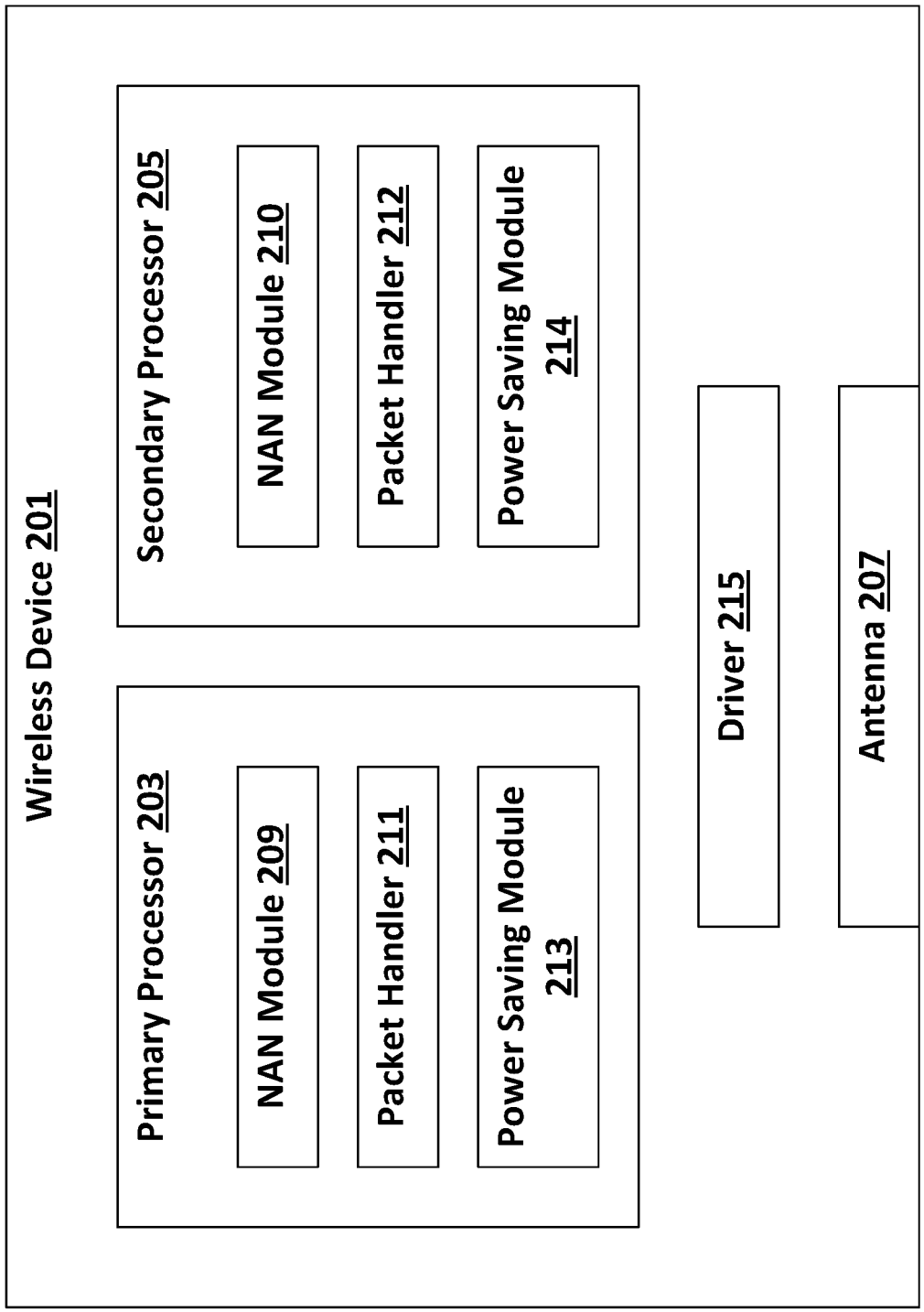
FIG. 2A depicts an embodiment of a wireless device for conducting NAN tethering.

Referring to FIG. 2A, an example embodiment of a wireless device for conducting NAN tethering is depicted. In brief overview, the wireless device 201 includes, in one or more embodiments, a primary processor 203, a secondary processor 205, a driver 215, and an antenna 207. In one or more embodiments, the antenna 207 is used to connect or communicate to one or more client devices, e.g., by transmitting and/or receiving one or more packets. In one or more embodiments, the antenna 207 includes any suitable configuration, structure and/or arrangement of one or more antenna elements, components, units, assemblies and/or arrays. In one or more embodiments, the antenna 207 implements transmit and receive functionalities using separate transmit and receive antenna elements. In one or more embodiments, the antenna 207 implements transmit and receive functionalities using common and/or integrated transmit/receive elements. The antenna includes, for example, a phased array antenna, a single element antenna, a set of switched beam antennas, and/or the like.

In one or more embodiments, the driver 215 includes any suitable configuration, structure/or arrangement of one or more driver elements, components, and/or units. In one or more embodiments, the driver 215 provides an interface enabling an operating system of a processor to access functions of another device or processor. In one or more embodiments, the driver 215 is implemented in hardware, software, or a combination of hardware and software. In one or more embodiments, the driver 215 enables communications between the primary processor 203 and the secondary processor 205. In one or more embodiments, the driver 215 includes multiple drivers, such as a cellular driver and a WiFi driver. The cellular driver enables the wireless device 201 to communicate via a cellular network, in one or more embodiments. The WiFi driver enables the wireless device 201 to communicate via a WLAN, in one or more embodiments.

In one or more embodiments, the primary processor 203 includes a NAN module 209, a packet handler 211, and/or a power saving module 213. In one or more embodiments, the secondary processor 205 includes a NAN module 210, a packet handler 212, and/or a power saving module 214. Each of these elements or components is implemented in hardware, or a combination of hardware and software, in one or more embodiments. For instance, each of these elements or components can include any application, program, library, script, task, service, process or any type and form of executable instructions executing on the processor 203 and the processor 205 of the wireless device 201, in one or more embodiments. In one or more embodiments, compared to the secondary processor 205, the primary processor 203 includes one or more extra elements or components for operating the wireless device 201. For example, the primary processor 203 includes a display module, memory, computing processing module, power module, etc., each of which consumes additional power when in operation.

In one or more embodiments, the primary processor 203 establishes access to communication bandwidth for communications with a network via the driver 215. In one or more embodiments, the NAN module 209 receive a request for a NAN service, from another wireless device, for wirelessly tethering to the wireless device 201 to access at least a portion of the communication bandwidth. In one or more embodiments, the NAN module 209 negotiates one or more wake up slots for the NAN service with the other wireless device responsive to the request. In one or more embodiments, the NAN module 209 establishes the NAN service with the other wireless device. In one or more embodiments, the NAN service (or a configuration of the NAN service) is established or implemented according to the negotiated one or more wake up time slots. For example, the NAN service is established to allocate at least the negotiated wake up time slots, e.g., for use by the other wireless device. No tethering by the other wireless device to the wireless device 201 is enabled during other time slots, in one or more embodiments.

In one or more embodiments, the packet handler 211 processes data (e.g., packets or traffic) received via the NAN service, e.g., during the wake up slots. In one or more embodiments, the packet handler 211 transmits data received via the NAN service to the secondary processor 205. In one or more embodiments, the NAN module 209 offloads the NAN service to the secondary processor 205 prior to the primary processor 203 entering a sleep mode. In one or more embodiments, the packet handler 211 executes in the operating system kernel and/or the primary processor, and bridges and/or routes packets that pass between a tethered device and a network. In one or more embodiments, the packet handler 211 performs network address and/or transport layer port translation for packets passing between the network and the primary processor, and/or packets passing between the primary and secondary processors In one or more embodiments, the handler 211 provides WAN/NAN tethering service to one or more client devices by translating packets using network address and/or port translation mechanisms, on behalf of the one or more client devices. In one or more embodiments, the packets received from client devices are protocol header converted (such as incorporating a change in network address or transport layer ports of IP/TCP/UDP header of a corresponding packet) by the handler, and packets are forwarded to the other interface (cellular interface or other WiFi wireless link). In one or more embodiments, packet flow context is maintained by the packet handler 211 to track the packets flow. In one or more embodiments, when the packets are received from the cellular interface or other WiFi link, the handler 211 performs the reverse protocol header conversions for IP/TCP/UDP and provides the processed packets to the client devices with and/or without the help of the packet flow context being maintained. In one or more embodiments, the handler 211 also provides WAN connectivity by just forwarding packets received from NAN train slots to a cellular or other WiFi wireless link and vice versa, which is sometimes known as bridging, with modifications at MAC layer.

In one or more embodiments, the power saving module 213 is designed or implemented to wake up the rest of or some components of the primary processor 203 during the one or more wake up time slots, and to instruct the primary processor 203 to be in a sleep mode during one or more sleep time slots for instance. In one or more embodiments, the primary processor 203 deactivates one or more components and/or network features while in the sleep mode or for operation in sleep mode. For example, while in the sleep mode, the primary processor 203 does not provide tethering services or transmit/receive data to/from other client devices. In one or more embodiments, the primary processor 203 activates one or more components and/or network features for operation in wake up mode. For example, while in the wake up mode, the primary processor 203 enables tethering and transmit/receive data to/from client devices. In one or more embodiments, the secondary processor 205 operates one or more applications of the wireless device 201 when the primary processor is in sleep mode. In one or more embodiments, the secondary processor 205 connects to a cellular network when the primary processor is in sleep mode.

In one or more embodiments, the secondary processor 205 provides a NAN service to the client device(s) responsive to the offloaded NAN service from the primary processor 203. In one or more embodiments, the NAN module 210 establishes and/or maintains the NAN service with the client device(s). For example, the secondary processor 205 receives a configuration or information (e.g., settings or parameters) about the NAN service being offloaded from the primary processor 203, and uses the received configuration or information to establish or configure a NAN service with the client device(s), in one or more embodiments. In one or more embodiments, the received configuration or information includes information negotiated for the NAN service being offloaded from the primary processor 203, such as the one or more wake up time slots. In one or more embodiments, the NAN module 210 of the secondary processor adopts (e.g., operates according to) the previously negotiated wake up time slots. In one or more embodiments, the NAN module 210 renegotiates with the client devices one or more wake up time slots. In one or more embodiments, the renegotiated wake up time slots are different from the wake up time slots negotiated between the primary processor 203 and the client devices. In one or more embodiments, the NAN module 210 monitors a network service quality for the established NAN service (or tethering session/connection/configuration) between the secondary processor 205 and the client devices. In one or more embodiments, the NAN module 210 compare the network service quality with a predefined quality threshold value (e.g., specified according to one or more of: level of dropped and/or queued packets, amount of available bandwidth between the first and second processors, web site or application response/loading metrics, or user feedback, etc.). In one or more embodiments, responsive to determining the network service quality is lower than the quality threshold value, the NAN module 210 terminates the NAN service and/or the hotspot tethering, and communicate with the NAN module 209 about the termination. In one or more embodiments, responsive to receiving the information of the termination between the secondary processor 205 and client devices, the NAN module 209 instruct the power saving module 213 to wake up the primary processor 203, for instance to reestablish a NAN service and/or the hotspot tethering between the primary processor 203 and the client devices.

In one or more embodiments, packet handler 212 processes data transmitted/received to/from the client device through the NAN service. In one or more embodiments, the power saving module 214 instructs the secondary processor 205 to enter or operate in a wake up mode during the renegotiated wake up time slots, and to enter or operate in a sleep mode during other time slots.

Figure 2B:
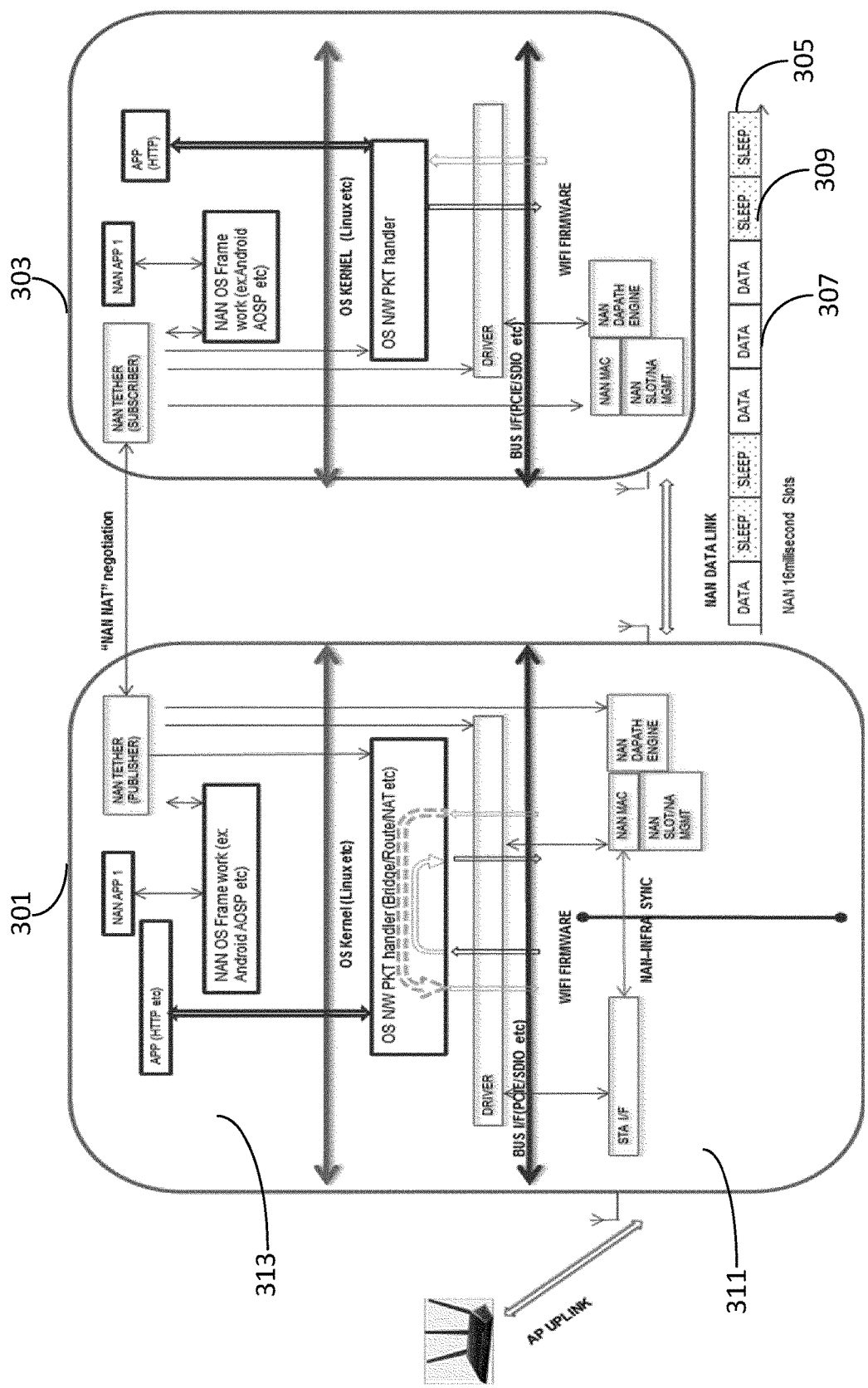
FIG. 2B depicts one embodiment of a NAN tethering architecture for tethering a host device with a client device.

Referring now to FIG. 2B, an example embodiment of a NAN tethering architecture for tethering a host device 301 with a client device 303 is depicted. In one or more embodiments, the host device provides a NAN service and/or hotspot tethering to the client device. In one or more embodiments, the NAN service and/or hotspot tethering enables the client device to connect to Internet through the host device. In one or more embodiments, the NAN service and/or hotspot tethering is negotiated between the host device and the client device in part based on the client device's bandwidth or data rate needs. In one or more embodiments, the host device establishes or configures a NAN service to include or provide a slot train (e.g., slot train 305). In one or more embodiments, the slot train includes wake up time slots (e.g., time slot 307) and sleep time slots (e.g., time slot 309). In one or more embodiments, during the wake up time slots, the host device enables hotspot tethering to the client device, and during the sleep time slots, the host device disables hotspot tethering with the client device. As such, the client device only communicates with or through the host device during predefined wake up time slots, during which the host device operates in wake up mode that consume more energy than during time slots for sleep mode. In this way, the host device avoids having to stay in wake up mode more than necessary (to handle data traffic with the client device), and therefore reduces overall power consumption.

In one or more embodiments, the host device utilizes a secondary processor 311 to connect to the Internet (or other network) through a WLAN. In one or more embodiments, the host device accesses a WLAN access point via a secondary processor (e.g., a WiFi dongle/chip/process). In one or more embodiments, the host device sometimes utilizes a primary processor 313 to provide the NAN service to the client device. In one or more embodiments, the host device routes data received at the primary processor from the client device via the NAN service, to the secondary processor. Similarly, the host device routes data received (e.g., via WiFi) through the secondary processor from the Internet (or other network), to the primary processor, so that the primary processor transmits the received data to the client device according to (negotiated slots of) the NAN service.

In one or more embodiments, the primary processor operates (e.g., handles hotspot tethering) according to the negotiated time train of the NAN service. For example, the primary processor enters and/or operates in a sleep mode during the sleep time slots and does not provide hotspot tethering to the client device. The primary processor enters and/or operates in a wake up mode during the wake time slots assigned for hotspot tethering, and provides hotspot tethering to the client device. In one or more embodiments, the secondary processor stays or operates in the awake mode for connecting the host device to the Internet.

Figure 2C:
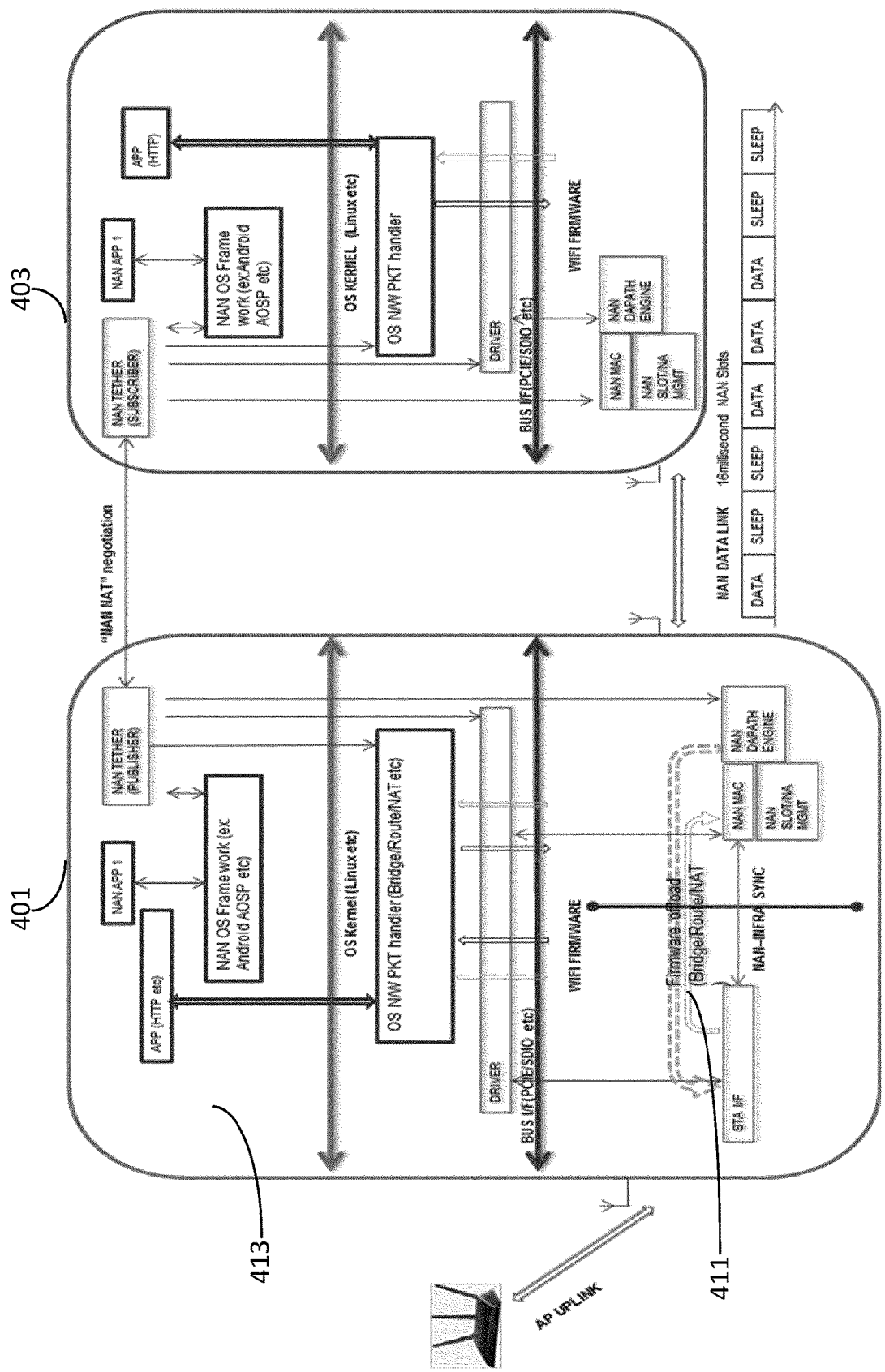
FIG. 2C depicts one embodiment of a NAN tethering architecture with dongle offload for tethering a host device with a client device.

Referring now to FIG. 2C, one example embodiment of a NAN tethering architecture with dongle offload for tethering a host device 401 with a client device 403 is depicted. In one or more embodiments, the host device 401 is similar to the wireless device 201 as described in FIG. 2A. In one or more embodiments, the host device utilizes a primary processor 413 to initiate or establish a NAN connection with the client device. In one or more embodiments, the NAN connection is established according to a negotiated slot train. In one or more embodiments, the negotiated slot train includes wake up time slots during which a hotspot-tethering connection is enabled and the host device is kept awake (e.g., operates in a wake up mode) to communicate with the client device, and sleep time slots during which the host device is kept inactive or asleep (e.g., operates in a sleep or low/reduced-power mode) to save power without communicating with any client devices.

In one or more embodiments, once the NAN connection is established, the host device offloads the NAN service from an operating system (e.g., of a primary processor) to dongle firmware 414 (e.g., of a secondary processor). In one or more embodiments, the dongle firmware includes or corresponds to a scaled/stripped down (or simplified) version of an operating system (e.g., as compared to the operating system of the primary processor), and packet handler, and allows the secondary processor to consume relatively less power. In one or more embodiments, the client device maintains a hotspot tethering connection with the host device without being aware of the NAN service being offloaded to the secondary processor within the host device. For instance, and in one or more embodiments, the secondary processor (e.g., WiFi dongle) is instructed to enable hotspot tethering with the client device during predefined wake up slots, and such hotspot tethering occurs or continues even during NAN service offload (since the predefined wake up slots are maintained and remain unaffected during the NAN service offload itself). In one or more embodiments, the host device maintains or provides continuous NAN service to the client device during the offloading process. In one or more embodiments, after the NAN service is offloaded to the dongle firmware, the host device renegotiates with the client device an updated slot train for the offloaded NAN service. In one or more embodiments, the updated slot train includes updated time slots which include updated sleep slots. In one or more embodiments, the secondary processor executing on the dongle firmware consumes less power than the primary processor executing in the primary processor's operating system (e.g., while each processor is in wake-up or active mode).

In one or more embodiments, the host device is connected to Internet via a WLAN. In one or more embodiments, the client device is connected to the Internet via the host device through the NAN service. In one or more embodiments, the host device determines a traffic pattern for the client device and uses the traffic pattern to configure the NAN service. For example, the host device determines when the client device should transmit data to the host device, predicts the data size, and/or determines which channel to use for the transmission. In one or more embodiments, the traffic pattern includes data type, data density/rate variations and averages, periodicity of traffic, minimum and/or maximum data rate(s), and/or transmitting time slots. In one or more embodiments, the host device or firmware renegotiates with the client device on the configuration (e.g., schedule, slot duration, wake up and sleep pattern) of the slot train based on the determined traffic pattern. For example, a result of the renegotiation includes specified wake up time slots that correspond to time slots of the client device for transmitting or communicating data via hotspot tethering. In one or more embodiments, the host device not provide hotspot tethering (or wake up) time slots to the client device if the client device does not need to transmit data or connect to the Internet for instance.

Figure 2D:
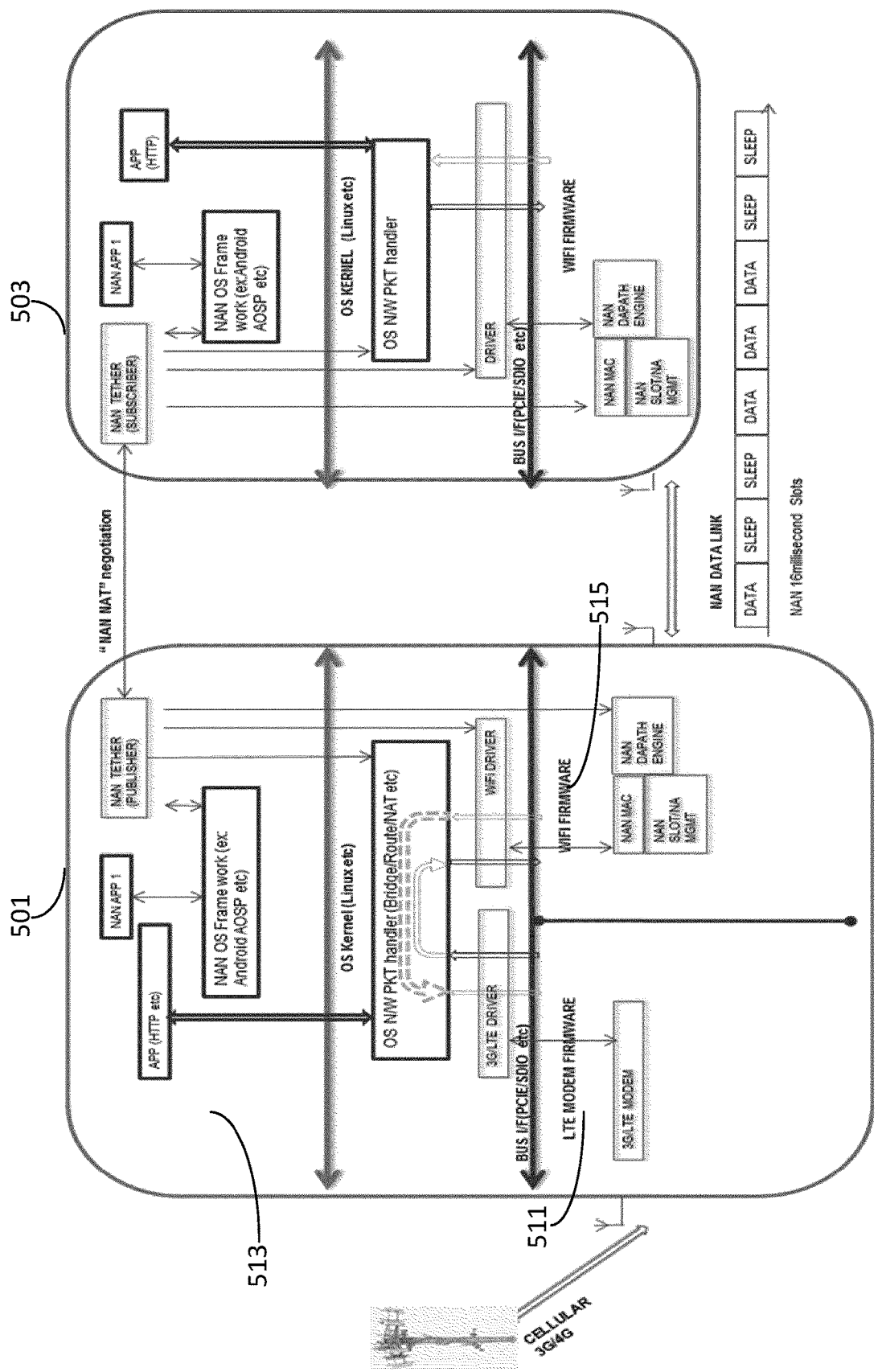
FIG. 2D depicts one embodiment of a NAN tethering architecture for tethering a host device with a client device

Referring now to FIG. 2D, one or more embodiments of a NAN tethering architecture for tethering a host device 501 with a client device 503 is depicted. In one or more embodiments, this tethering architecture is similar to the NAN tethering architecture described in FIG. 2B, except that the host device 501 is connected to Internet via a cellular network (e.g., 3G, 4G networks). In one or more embodiments, the host device includes cellular firmware 511 establishing a cellular (e.g., 3G or 4G) connection to the Internet. In one or more embodiments, the host device includes WiFi firmware 515 establishing a NAN connection to a client device. In one or more embodiments, the host device utilizes a primary processor 513 to provide a NAN service to the client device by negotiating a slot train. In one or more embodiments, the primary processor receives data from the client device and transmits the data to the WiFi firmware. The WiFi firmware further routes the data to the cellular firmware via a packet handler and one or more drivers (WiFi driver and/or 3G/LTE driver). In this way, the client device transmits data to the Internet through NAN connection between the host device and the client device, and the cellular connection between the host device and the Internet.

Figure 2E:
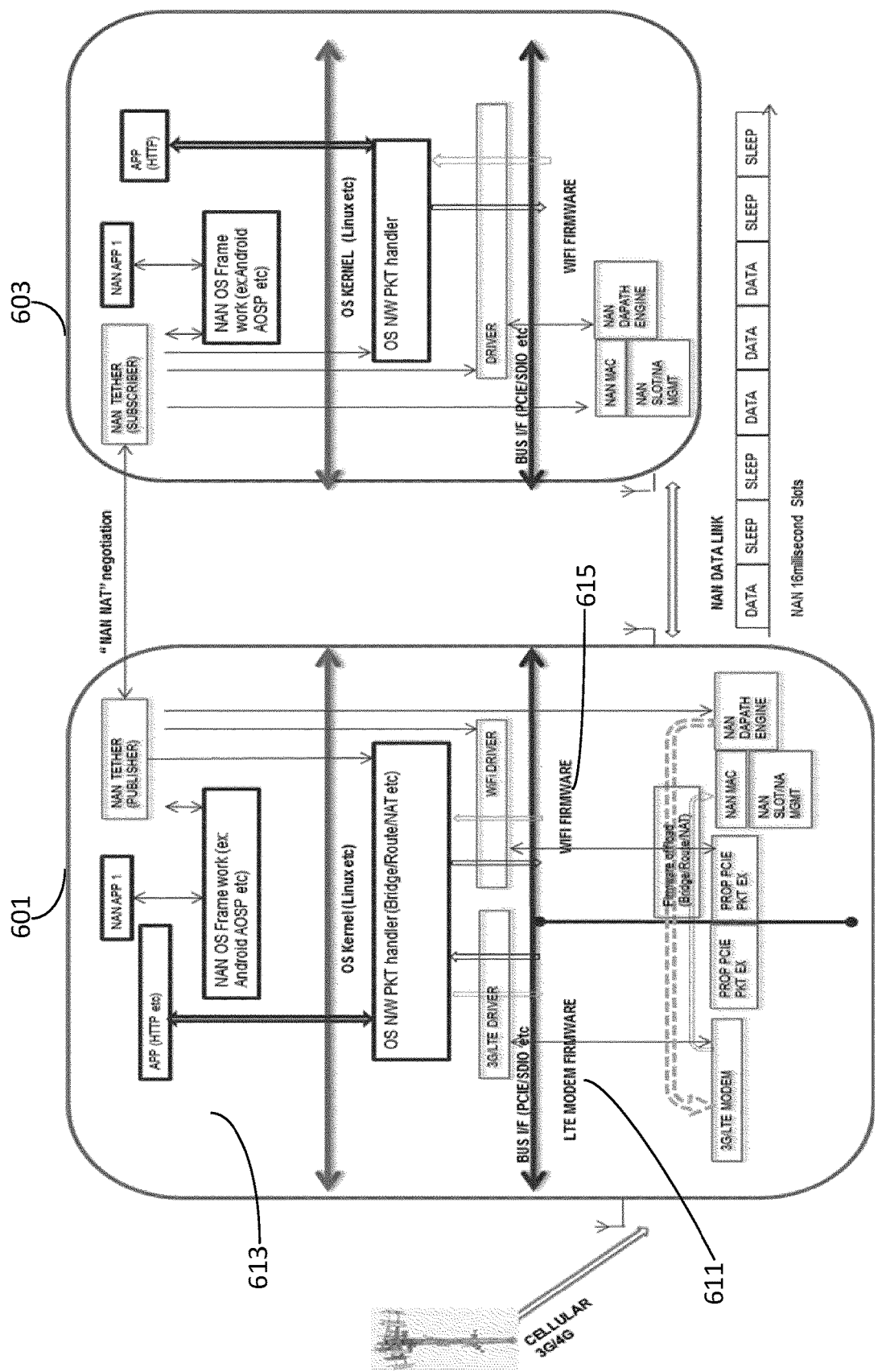
FIG. 2E depicts one embodiment of a NAN tethering architecture with dongle offload for tethering a host device with a client device

Referring now to FIG. 2E, an embodiment of a NAN tethering architecture with dongle offload for tethering a host device 601 with a client device 603 is depicted. In one or more embodiments, this architecture is similar to the NAN tethering architecture described in FIG. 2C, except that the host device is for instance connected to Internet (or other network) via a cellular network (e.g., 3G, 4G networks). In one or more embodiments, the host device utilizes a primary processor 613 to initialize a NAN service to a client device by negotiating a slot train. In one or more embodiments, the host device utilizes a cellular firmware 611 to establish a cellular connection between the host device and the Internet. In one or more embodiments, the primary processor receives data from the client device and transmits the data to a WiFi firmware 615. In one or more embodiments, the WiFi firmware further transmits the data to the cellular firmware which then transmits the data to a secondary processor. In one or more embodiments, the cellular firmware receives data from the Internet and transmits the data to the WiFi firmware and the secondary processor. In one or more embodiments, the WiFi firmware transmits the received data to the primary processor and further transmits the data to the client device via the NAN service.

In one or more embodiments, after the NAN service is established between the host device and the client device, the primary processor offloads the NAN service to the secondary processor. For instance, the primary processor offloads the NAN service to the secondary processor in response to or once the NAN service is established between the host device and the client device. In one or more embodiments, the secondary processor negotiates with the client device for an updated slot train. In one or more embodiments, the secondary processor provides or establishes a NAN service connection to the client device according to the updated slot train. In one or more embodiments, once the NAN service is offloaded to the secondary processor, the primary processor enters into a sleep mode to save power.

In one or more embodiments, the secondary processor only communicates with the client device when there is data available for transmission. In one or more embodiments, the secondary processor receives data from the client device via the updated NAN service during wake up time slots of the updated slot train. In one or more embodiments, the secondary processor includes a NAN module and/or a cellular module. In one or more embodiments, the NAN module communicates with the client device via the NAN service. In one or more embodiments, the cellular module communicates with the cellular firmware. For example, the NAN module receives data from the client device via the NAN service, and transmits the data to the cellular module. The cellular module further transmits the data to the cellular firmware and/or further to the Internet. Similarly, the cellular module receives data from the cellular firmware and transmits the data to the NAN module and further to the client device via the NAN tethering.

In one or more embodiments, the NAN module and/or the cellular module of the secondary processor instruct the secondary processor to enter or operate in a sleep mode during sleep time slots of the renegotiated slot train, and to enter or operate in a wake up mode during wake time slots of the renegotiated slot train. In one or more embodiments, the WiFi firmware and/or the cellular firmware do not change operation modes based on the slot train. For example, the WiFi firmware and/or the cellular firmware (and/or the secondary processor) are in a wake up mode continuously independent of whether the primary processor in a wake up mode or in a sleep mode.

In one or more embodiments, each host device as described above includes multiple modules that enable the host device to provide NAN service tethering to one or more client devices to the internet for instance. In one or more embodiments, each module includes hardware or a combination of software and hardware. In one or more embodiments, the multiple modules include one or more of: a NAN medium access controller (MAC) module, a NAN SLOT/ NA MGMT module, a NAN DATA ENGINE module, and/or a NAN TETHER (publisher) module. Some of these modules (or similar modules) are included in the client device, and may operate with corresponding modules in the host device to perform certain operations.

In one or more embodiments, the NAN MAC module synchronizes time slots with a client device in order to provide NAN protocol operation with correct wake up time slots for beacon transmission and/or reception, for a discovery window, for a data transfer window (e.g., for packet transmission and/or reception), etc. In one or more embodiments, the NAN SLOT/NA MGMT module exchanges protocol messages with a peer NAN device (e.g., a client device) to derive mutually agreeable NAN availability slots and instruct NAN MAC about the resultant wake up time slots (or "wake train") schedule. In one or more embodiments, the NAN DATA ENGINE module fetches data from a host driver, passes the data on to the NAN MAC module, and/or monitors/tracks quality of service (QoS), for example.

In one or more embodiments, the NAN TETHER (subscriber) module enables the corresponding client device to tether to a host device. In one or more embodiments, when the NAN TETHER (subscriber) module is triggered by a user, the NAN TETHER (subscriber) module uses (or operates/communicates with) the NAN MAC module to find or detect a device (e.g., hotspot or host device) that publishes the device's capability/availability of a tethering service, and establishes a session through the NAN modules. In one or more embodiments, the host/hotspot device that enables NAN service includes a NAN TETHER (publisher) module that enables the host device to announce the availability of tethering service that the host device is enabling/providing. In one or more embodiments, the NAN TETHER (publisher) module instructs the NAN modules (such as the driver, MAC, DATAPATH, and/or SLOT/NA MGMT modules) to provide communication bandwidth to one or more subscriber devices. In one or more embodiments, the NAN TETHER (publisher) module also configures the packet translation modules for network address and/or port translation. In one or more embodiments, the driver module(s) provide interface(s) for the primary processor operating system and NAN framework with the WiFi firmware running on the secondary processor.

Figure 3:
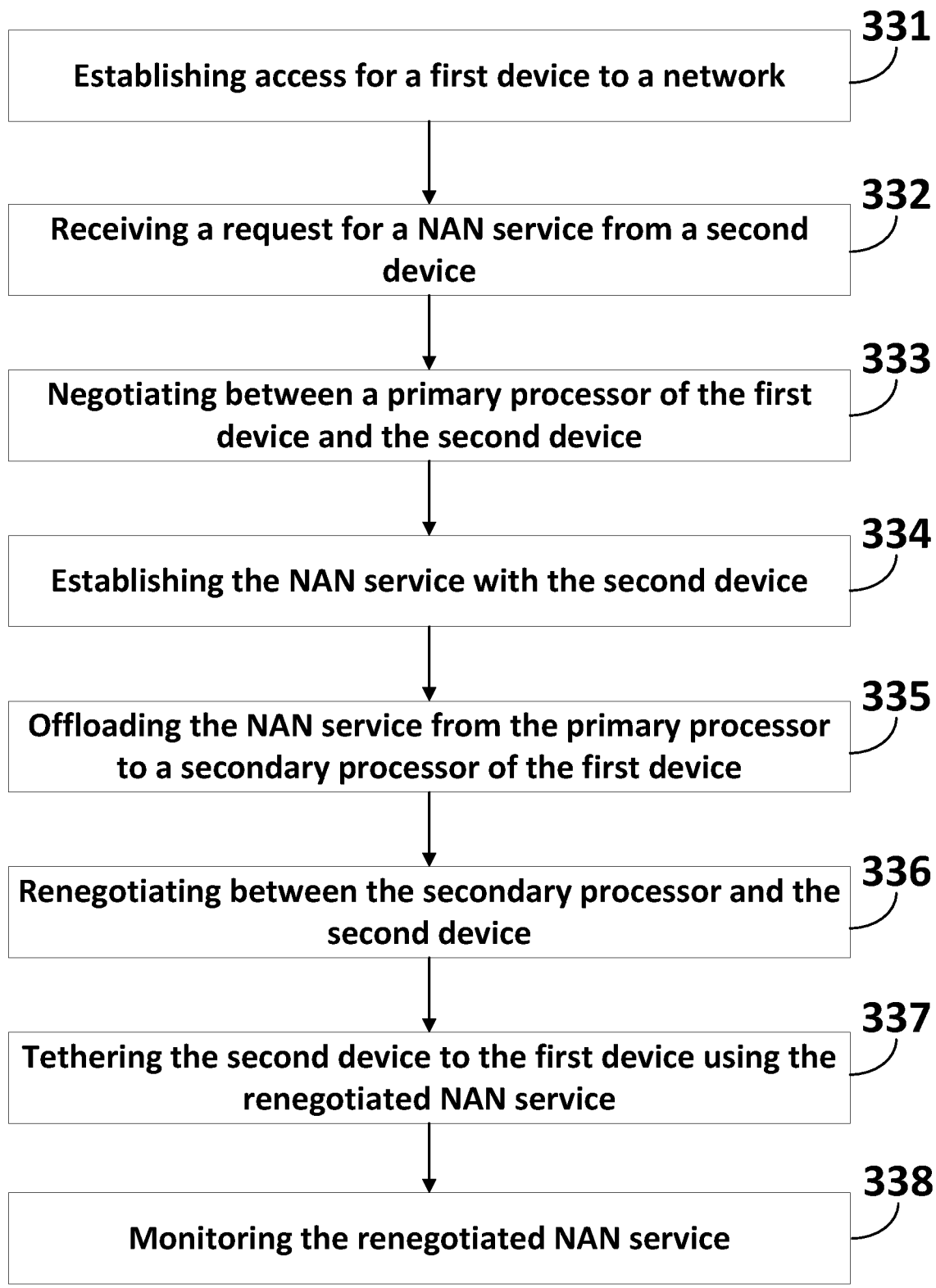
FIG. 3 is a flow chart depicting a method for NAN tethering a first wireless device with a second wireless device.

Referring now to FIG. 3, one or more embodiments of a method for NAN tethering a first wireless device with a second wireless device are depicted. In one or more embodiments, the method includes establishing, by a primary processor of a first wireless device, access to communication bandwidth for communications with a network (operation 331). In one or more embodiments, the primary processor receives a request for a NAN service from a second wireless device, for wirelessly tethering to the first wireless device to access at least a portion of the communication bandwidth (operation 332). In one or more embodiments, the primary processor negotiates one or more first wake up slots for the NAN service with the second wireless device responsive to the request (operation 333). In one or more embodiments, the primary processor establishes the NAN service with the second wireless device according to the one or more first wake up slots (operation 334). In one or more embodiments, the primary processor offloads the NAN service to a secondary processor of the first wireless device, responsive to establishing the NAN service and prior to the primary processor entering into a sleep mode (operation 335). In one or more embodiments, the secondary processor renegotiates one or more second wake up slots with the second wireless device (operation 336). The secondary processor wirelessly tethers the second wireless device to the first wireless device, using the one or more second wake up slots of the offloaded NAN service (operation 337). The secondary processor monitors the renegotiated NAN service (operation 338)

At operation 331, and in one or more embodiments, a primary processor of a first wireless device establishes access to communication bandwidth for communications with a network. The first device is connected to the network using the primary processor according to some embodiments. In some embodiments, the first device includes the primary processor and the secondary processor. In some embodiments, the primary processor consumes more power than the secondary processor while active or in operation (e.g., in wake-up mode). In some embodiments, the first device is constantly connected to the network. In some embodiments, the primary processor has a wake up mode and a sleep mode. In some embodiments, the first device communicates to the network under the wake up mode, and does not communicate to the network under the sleep mode.

At operation 332, the primary processor receives a request for a NAN service from a second wireless device, for wirelessly tethering to the first wireless device to access at least a portion of the communication bandwidth. In one or more embodiments, the primary processor establishes a NAN service with the second wireless device (e.g., responsive to receiving the request), and/or makes the NAN service available to the second wireless device. In some embodiments, the primary processor receives a plurality of requests for NAN services from a plurality of nearby wireless devices. In some embodiments, the primary processor constantly listens for requests from nearby wireless devices. In some embodiments, the primary processor only listens to the requests at scheduled time slots. In some embodiments, the NAN service enables the second device to be connected to the network through the first device. In some embodiments, the NAN service is established using various WiFi connections, such as through simultaneous dual band WiFi connections, single band WiFi connections, or otherwise.

At operation 333, and in one or more embodiments, the primary processor negotiates one or more first wake up slots for the NAN service with the second wireless device responsive to the request. In response to receiving the request from the second device, the primary processor negotiates one or more first wake up slots with the second wireless device. In some embodiments, the NAN service allows the second device to connect to the network during the wake up slots. In some embodiments, the first wake up slots are negotiated based on (projected or actual) communication requirements of the second wireless device. For example, the wake up slots are determined when data is to be transmitted to/from the second device to the network, in one or more embodiments. In some embodiments, the first device negotiates a plurality of first wake up slots with a plurality of second devices in response to receiving the plurality of requests for NAN services.

At operation 334, and in one or more embodiments, the primary processor establishes the NAN service with the second wireless device according to the one or more first wake up slots. In one or more embodiments, the primary processor establishes NAN service with the second device using the negotiated first wake up slots. In some embodiments, the primary processor establishes multiple NAN services with multiple second devices at the same time. The multiple NAN services are independent from each other.

At operation 335, and in one or more embodiments, the primary processor offloads the NAN service to a secondary processor of the first wireless device, responsive to establishing the NAN service and prior to the primary processor entering into a sleep mode. The primary processor determines to offloads the NAN service from the primary processor to the secondary processor of the first device, in preparation to enter into sleep mode. In some embodiments, the primary processor offloads the NAN service by transmitting the second device information and the first wake up slots to the secondary processor, so that the secondary processor uses the second device information and the first wake slots to establish NAN service between the first device and second device. In some embodiments, the secondary processor is a dongle device. In some embodiments, once the NAN service is offloaded to the secondary processor, the primary processor enters a sleep mode to reduce power consumption. In some embodiments, the primary processor occasionally wakes up from the sleep mode to monitor the NAN service provided by the secondary processor to the second device.

At operation 336, and in one or more embodiments, the secondary processor renegotiates one or more second wake up slots with the second wireless device. In response to establishing the NAN service between the secondary processor and the second device, the secondary processor determines whether the first wake up slots meet the communication requirements of the second device, in one or more embodiments. For example, the secondary processor determines if there is any change in the level of communications between the second device and the network. In some embodiments, in response to determining that the first wake up slots do not meet the requirements of the second device, the secondary processor renegotiates with the second device for second wake up slots. In some embodiments, the secondary processor renegotiates the second wake up slots with the second device once the NAN service is offloaded to the secondary device.

At operation 337, and in one or more embodiments, the secondary processor wirelessly tethers the second wireless device to the first wireless device, using the one or more second wake up slots of the offloaded NAN service. In one or more embodiments, the secondary processor tethers the second device to the first device in order to be connected to the network through the first device. In some embodiments, the secondary processor tethers the second device to the first device using the established NAN service between the secondary processor and the second device using the renegotiated wake up slots.

At operation 338, and in one or more embodiments, the secondary processor monitors the renegotiated NAN service. The secondary processor monitors the renegotiated NAN service at certain intervals or upon occurrence of certain events, according to some embodiments. In some embodiments, when the renegotiated NAN service has a quality bellow a predetermined threshold, the secondary processor renegotiates a new NAN service with the second device. In some embodiments, when the NAN service between the secondary processor and the second device becomes dis-established, the secondary processor transmits a wake up signal to the primary processor to notify the dropped NAN service between the secondary processor and the second device. In some embodiments, in response to receiving the dropped notification from the secondary processor, the primary processor reestablishes a NAN service with the second device.

Although examples of communications systems described above can include devices and access points operating according to an IEEE 802.11 (WiFi), 3GPP, or 4G (i.e., LTE) standard, it should be understood that embodiments of the systems and methods described can operate according to other standards and use wireless communications devices other than devices implemented as devices and base stations. For example, communication interfaces associated with cellular networks, satellite communications, vehicle communication networks, 802.11 and other non-802.11 wireless networks can utilize the systems and methods described herein to achieve improved overall capacity and/or link quality without departing from the scope of the systems and methods described herein.

It should be understand that in some embodiments, the NAN service described above is based on WiFi standards. The NAN service can be adapted to any WiFi stations, such as a simultaneous dual band (SDB) WiFi station.

It should be noted that certain passages of this disclosure can reference terms such as "first" and "second" in connection with devices, processor, firmwares, commnication protocols, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method, comprising:
   establishing, by a primary processor of a first wireless device, access to communication bandwidth for communications with a network;
   receiving, at the primary processor, a request for a neighbor awareness networking (NAN) service from a second wireless device, for wireless tethering to the first wireless device to access at least a portion of the communication bandwidth;
   negotiating, by the primary processor, one or more first wake up slots for the NAN service with the second wireless device in in response to the request;
   establishing, by the primary processor, the NAN service for the wireless tethering with the second wireless device according to the one or more first wake up slots;

offloading the NAN service for the wireless tethering from the primary processor to a secondary processor of the first wireless device, in response to establishing the NAN service for the wireless tethering and prior to the primary processor entering into a sleep mode;

renegotiating, by the secondary processor for the offloaded NAN service for the wireless tethering, one or more second wake up slots with the second wireless device, in response to offloading the NAN service for the wireless tethering; and wirelessly tethering, by the secondary processor, the second wireless device to the first wireless device, using the one or more second wake up slots of the offloaded NAN service.

2. The method of claim 1, wherein the first wireless device is configured to allow the second wireless device access to the at least the portion of the communication bandwidth during at least one of the one or more first wake up slots or at least one of the one or more second wake up slots.

3. The method of claim 1, further comprising:
determining, by the secondary processor, a traffic pattern of the second wireless device, the traffic pattern comprising at least one of: a traffic type, or a traffic channel associated with the second wireless device.

4. The method of claim 3, wherein renegotiating the one or more second wake up slots comprises renegotiating the one or more second wake up slots according to the determined traffic pattern of the second wireless device.

5. The method of claim 4, further comprising:
determining, by the secondary processor, a NAN slot train for communicating with the second wireless device, the NAN slot train including the one or more second wake up slots and a set of sleep slots.

6. The method of claim 5, further comprising entering, by the secondary processor, a wake up mode and allowing the second wireless device access to the at least the portion of the communication bandwidth during each of the one or more second wake up slots.

7. The method of claim 5, further comprising entering, by the secondary processor, the sleep mode and preventing the second wireless device access to the at least the portion of the communication bandwidth during each of the sleep slots, wherein operation in the wake up mode consumes more power than operation in the sleep mode.

8. The method of claim 1, further comprising:
determining, by the secondary processor, a service quality of the NAN service for the wireless tethering; and
in response to determining that the service quality is below a threshold, causing the primary processor to transition from the sleep mode to a wake up mode.

9. A wireless device, comprising:
a primary processor configured to:
establish access by the wireless device to communication bandwidth for communications with a network;
receive a request for a neighbor awareness networking (NAN) service from a client device, for wireless tethering to the wireless device to access at least a portion of the communication bandwidth;
negotiate one or more first wake up slots for the NAN service for the wireless tethering with the client device in response to the request;
establish the NAN service for the wireless tethering with the client device according to the one or more first wake up slots; and
offload the NAN service for the wireless tethering from the primary processor to a secondary processor of the wireless device, in response to establishing the NAN service for the wireless tethering and prior to the primary processor entering into a sleep mode; and the secondary processor for the offloaded NAN service for the wireless tethering, configured to:
renegotiate, for the offloaded NAN service for the wireless tethering, one or more second wake up slots with the client device, in response to offloading the NAN service for the wireless tethering;
wirelessly tether the client device to the wireless device using the one or more second wake up slots of the offloaded NAN service;
determine a service quality of the NAN service for the wireless tethering; and
in response to determining that the service quality is below a threshold, cause the primary processor to transition from the sleep mode to a wake up mode.

10. The wireless device of claim 9, wherein the wireless device is configured to allow the client device access to the at least the portion of the communication bandwidth during at least one of the one or more first wake up slots or at least one of the one or more second wake up slots.

11. The wireless device of claim 9, wherein the secondary processor is configured to determine a traffic pattern of the client device, the traffic pattern comprising at least one of: a traffic type, or a traffic channel associated with the client device.

12. The wireless device of claim 11, wherein the secondary processor is configured to renegotiate the one or more second wake up slots according to the determined traffic pattern of the client device.

13. The wireless device of claim 9, wherein the secondary processor is configured to determine a NAN slot train for communicating with the client device, the NAN slot train including of the one or more second wake up slots and a set of sleep slots.

14. The wireless device of claim 13, wherein the secondary processor is configured to enter a wake up mode and allow the client device access to the at least the portion of the communication bandwidth during each of the one or more second wake up slots.

15. The wireless device of claim 14, wherein the secondary processor is configured to enter the sleep mode and prevent the client device access to the at least the portion of the communication bandwidth during each of the sleep slots, wherein operation in the wake up mode consumes more power than operation in the sleep mode.

16. The wireless device of claim 9, wherein the primary processor is configured in a sleep mode, while the secondary processor wirelessly tethers the client device to the wireless device.

17. A non-transitory computer readable memory medium of a wireless device storing program instructions executable by one or more processors of the wireless device to:
cause a primary processor to:
establish access by the wireless device to communication bandwidth for communications with a network;
receive a request for a neighbor awareness networking (NAN) service from a client device, for wireless tethering to the wireless device to access at least a portion of the communication bandwidth;
negotiate one or more first wake up slots for the NAN service for the wireless tethering with the client device in response to the request;
establish the NAN service for the wireless tethering with the client device according to the one or more first wake up slots; and offload the NAN service for the wireless tethering from the primary processor to a secondary processor of the wireless device, in response to establishing the NAN service for the wireless tethering and prior to the primary processor entering into a sleep mode; and cause the secondary processor for the offloaded NAN service for the wireless tethering to:
- renegotiate, for the offloaded NAN service for the wireless tethering, one or more second wake up slots with the client device, in response to offloading the NAN service for the wireless tethering;
- wirelessly tether the client device to the wireless device using the one or more second wake up slots of the offloaded NAN service;
- determine a service quality of the NAN service for the wireless tethering; and
- in response to determining that the service quality is below a threshold, cause the primary processor to transition from the sleep mode to a wake up mode.

18. The non-transitory computer readable memory medium of claim 17, wherein the wireless device is configured to allow the client device access to the at least the portion of the communication bandwidth during at least one of the one or more first wake up slots or at least one of the one or more second wake up slots.

19. The non-transitory computer readable memory medium of claim 17, wherein the secondary processor is configured to determine a traffic pattern of the client device, the traffic pattern comprising at least one of: a traffic type, or a traffic channel associated with the client device.

20. The non-transitory computer readable memory medium of claim 17, wherein the primary processor is configured in a sleep mode, while the secondary processor wirelessly tethers the client device to the wireless device.

* * * * *